No. 845,485. PATENTED FEB. 26, 1907.
E. C. SMITH.
PLANTING MACHINE.
APPLICATION FILED AUG. 31, 1906.
2 SHEETS—SHEET 2.
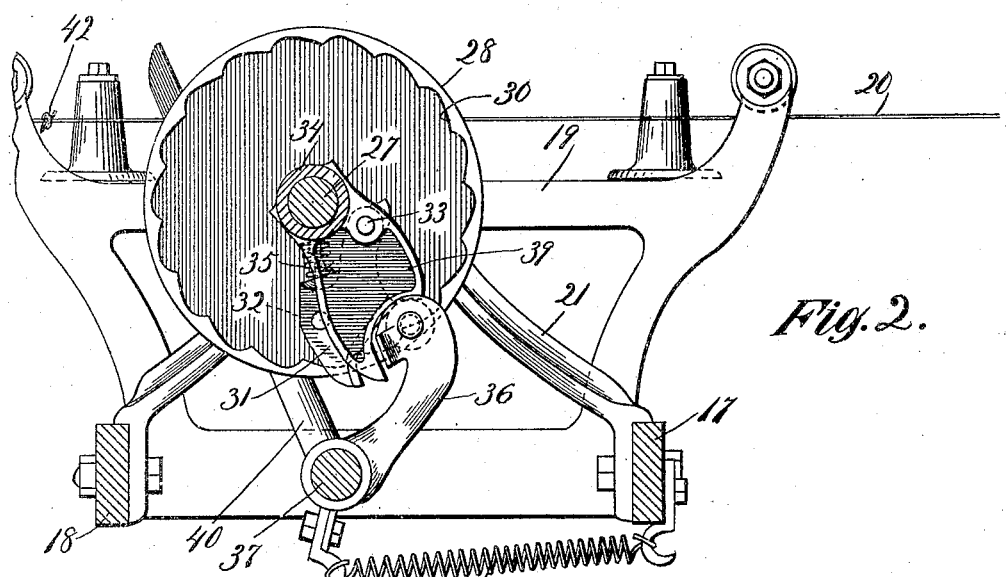
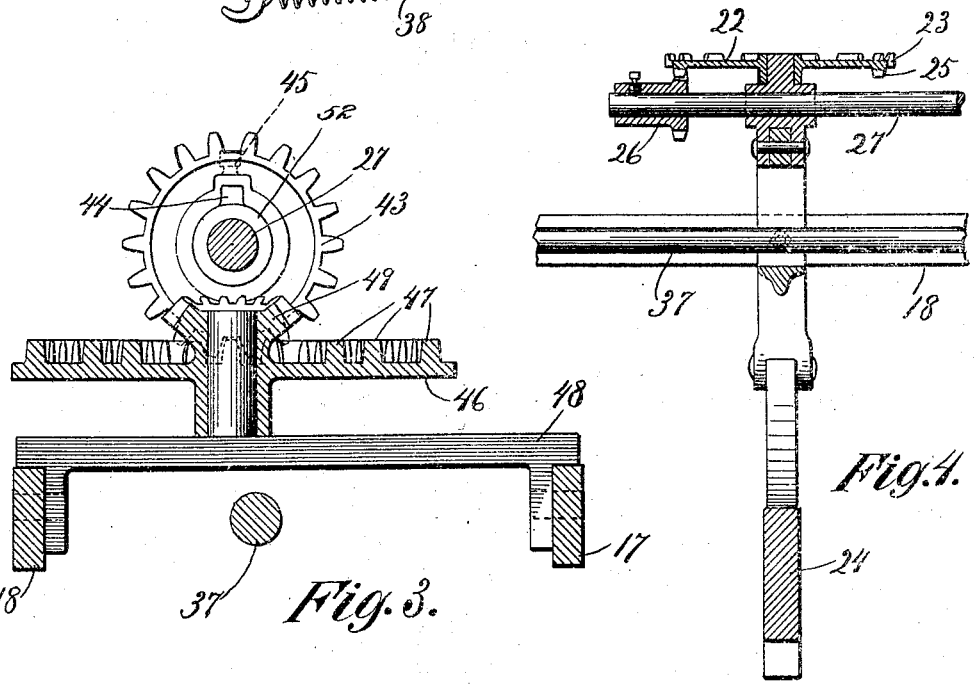
Witnesses:
W. H. Cotton
Charles B. Gillson.
Inventor.
Ernest C. Smith
By Louis K. Gilson Atty.

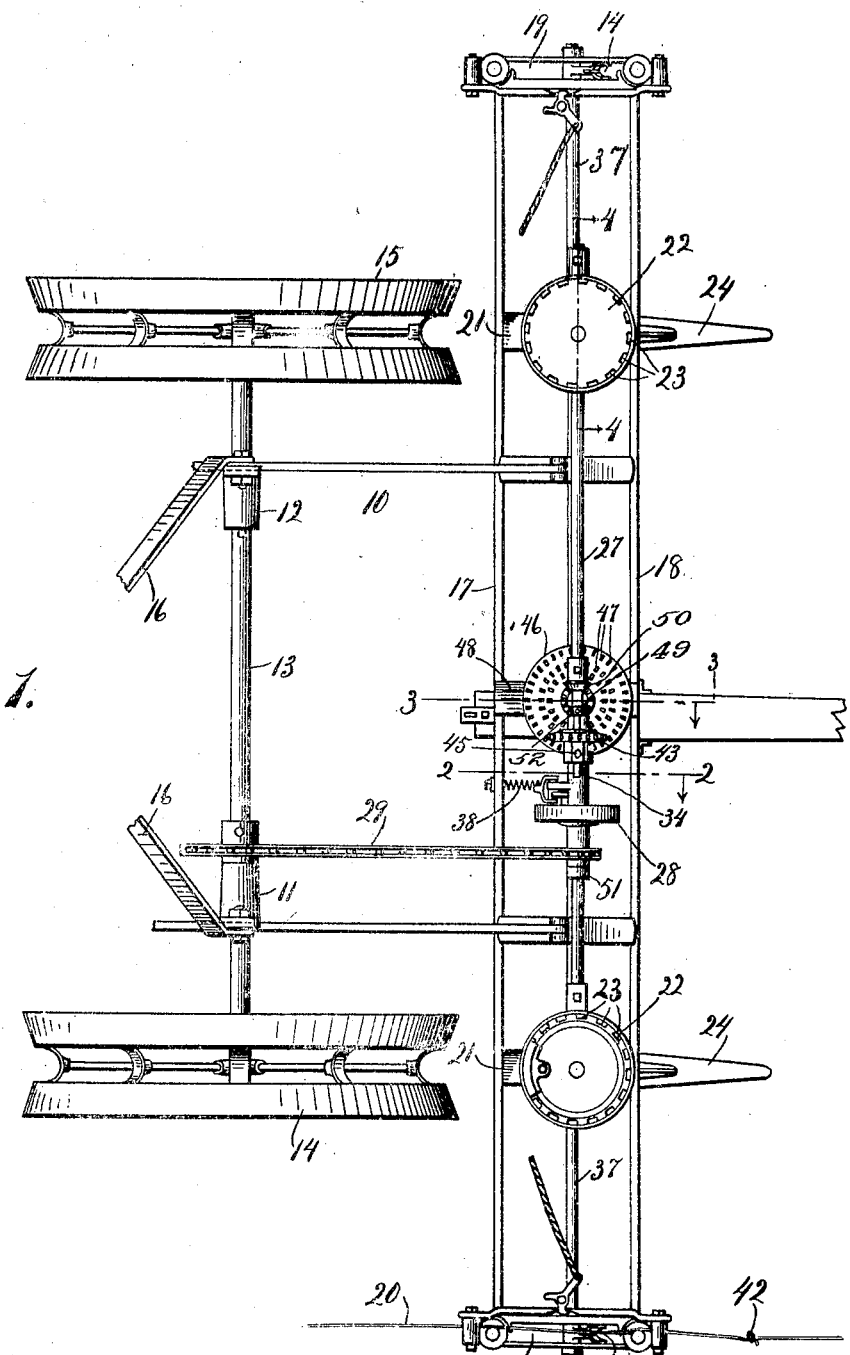

UNITED STATES PATENT OFFICE.

ERNEST C. SMITH, OF HINCKLEY, ILLINOIS, ASSIGNOR TO ROCK ISLAND PLOW COMPANY, OF ROCK ISLAND, ILLINOIS, A CORPORATION OF ILLINOIS.

PLANTING-MACHINE.

No. 845,485.  Specification of Letters Patent.  Patented Feb. 26, 1907.

Application filed August 31, 1906. Serial No. 332,848.

*To all whom it may concern:*

Be it known that I, ERNEST C. SMITH, a citizen of the United States, and a resident of Hinckley, county of Kendall, and State of Illinois, have invented certain new and useful Improvements in Planting-Machines, of which the following is a specification, and which are illustrated in the accompanying drawings, forming a part thereof.

The invention relates to planting-machines in which there is provided a seed-dropping mechanism having an intermittent movement and adapted to deposit a predetermined quantity of seed at intervals as the machine passes over the ground to be treated.

The object of the invention is to provide in such a machine adjustable means for determining the quantity of seed to be delivered at each movement of the dropping mechanism.

Machines of the type described may be employed for planting corn in hills, and when intended for that use, as heretofore constructed, comprise a seed-hopper and dropping mechanism including a rotatable seed-plate having a plurality of cells, each adapted to receive a definite quantity of seed (usually a single kernel) from the hopper and to deliver it when the plate is turned to a suitable discharge-spout. The spout is commonly valved in order that a number of seeds may be collected therein and deposited simultaneously at a given point on the ground by temporarily opening the valve.

Means are provided for intermittently turning the seed-plate, and to insure the same number of seeds being delivered to the spout at each movement of the plate this driving mechanism includes a clutch adapted to be automatically disengaged when the rotating members of which it forms a part have turned through a definite angular distance— for example, one complete revolution. The clutch and the valve of the seed-delivery spout are commonly operated by means of a check-row wire stretched across the field and having a plurality of tappets arranged thereon, the tappets being consecutively engaged by a suitable tripping mechanism carried by the machine.

The preferred method of operating machines of this type is to cause the valve of the seed-delivery spout to be temporarily opened to discharge the seeds delivered thereto by the last preceding movement of the seed-plate simultaneously with the beginning of rotation of the seed-plate, the valve then being immediately closed to retain within the spout for subsequent discharge the seeds delivered by such rotation of the plate.

By means of this construction and method of operation it is possible to drive the parts at such a speed that the seed-plate is certain to have completed its movement before the valve of the delivery-spout is again opened, and the same number of seeds are therefore deposited for each hill of grain planted. It has been found desirable in some instances, however, to vary the number of seeds which shall be deposited for each hill, and the invention provides improved means for effecting that result.

The invention contemplates a variable-speed driving connection between the clutch and the seed-dropping mechanism of planting-machines and is exemplified in the structure to be hereinafter described, and illustrated in the accompanying drawings, in which—

Figure 1 is a detail plan view of a planting-machine constructed according to the invention; and Figs. 2, 3, and 4 are detail vertical sectional views on the lines 2 2, 3 3, and 4 4, respectively, of Fig. 1.

The particular form of machine illustrated in the drawings is provided with a frame, (generally designated 10,) and having journal-bearings 11 12 for the axle 13 of a pair of carrying-wheels 14 15. The frame 10 is also provided with suitable supports 16 for a driver's seat (not shown) and preferably includes a pair of frame members 17 18, extending across the machine in front of the carrying-wheels for its entire width. The frame-members 17 18 are united at each end by a head 19, carrying forked arms adapted to receive a check-row wire 20, and are connected intermediate their ends by an arch-form bracket 21, two of which are shown, and each of these brackets carries seed-dropping mechanism, including a seed-plate 22, rotatably mounted on the bracket.

Each of the seed-plates 22 is provided with a plurality of cells 23, each adapted to receive a single kernel of corn from a seed-hopper and to deliver it to a discharge-spout (not shown) when the plate is turned to cause the cell to pass the mouth of the spout. The seed-hopper and discharge-spout being of ordinary construction have been omitted from the drawings. A furrow-making device (shown as taking the form of a runner 24) is also supported by each of the brackets 21 immediately below the seed-plate 22, and preferably these parts are also directly in front of the carrying-wheels 14 15 in order that the furrow opened by the runner 24 may be closed by the passage of the wheel over it.

A series of gear-teeth 25 are formed on the under face of each of the seed-plates 22, and these are engaged to turn the plate by a pinion 26, fixed in position on a driving-shaft 27, which, as shown, extends across the machine in order to serve both sets of dropping mechanisms and is journaled in the brackets 21.

Mechanism is provided for intermittently turning the driving-shaft 27. Preferably this comprises a clutch-disk 28, which turns loosely on the driving-shaft and is continuously driven when the machine is in operation by means of a sprocket-chain 29, leading from the axle 13. As shown, the rim of the clutch-disk 28 is provided with a plurality of inwardly-directed clutch-teeth 30, and these are adapted to be intermittently engaged by an arm 31, having a clutch-engaging roller 32, and pivotally attached at 33 to a counter-shaft 34.

A spring 35 reacts between the clutch-arm 31 and a suitable shoulder formed on the counter-shaft 34 to engage the clutch members and is normally compressed by means of a trip 36, mounted on a rock-shaft 37 and yieldingly held in contact with the arm 31 by means of a spring 38, having greater elastic force than that of the spring 35. A stop-arm 39 is also carried by the counter-shaft 34 and comes into engagement with the trip 36 after the latter has effected the disengagement of the clutch to bring the parts to rest in a definite position. The rock-shaft 37 extends from side to side of the machine, being journaled at each end in the heads 19. It carries adjacent each end a rocker-arm 40, having a bifurcated end 41, adapted to be engaged by the tappets 42 of the check-row wire 20.

The counter-shaft 34 preferably takes the form of a sleeve inclosing a portion of the driving-shaft 27 and has a variable-speed-gear connection with that shaft. As shown, this connection comprises a pinion 43, fixed against rotation upon the counter-shaft by means of a keyway 44 formed thereon and adjustably secured in position by means of a set-nut 45, passing through its hub. A gear 46, having a plurality of series of gear-teeth 47 of different diameters, any one of which may be engaged by the pinion 43, is rotatably mounted on a bracket 48, carried by the frame members 17 18, and has a gear connection through the bevel-pinions 49 50 with the driving-shaft 27. A pair of collars 51 52, fixed in position on the driving-shaft, are provided to prevent the displacement of the clutch-disk 28 and the counter-shaft or sleeve 34.

In use the seed-plates 22 will be actuated whenever the rocker-arm 40 is swung by contact with one of the tappets 42, carried by the check-row wire 20, to permit the clutch members 28 and 31 to interengage. The clutch will be automatically released, however, and the parts brought to rest by a reëngagement of the trip 36 with the clutch-arm 31 and the stop 36 after the clutch-disk 28 has made one complete revolution. In this way both of the seed-plates 22 are turned through a definite angular distance each time the clutch is operated. Moreover, the distance through which the plates turn at each movement may be adjustably controlled by changing the position of the pinion 43 on the sleeve 34 in order that a different set of gear-teeth 47 on the gear 46 may be engaged thereby.

I claim as my invention—

1. In a planting-machine, in combination, a traction-wheel, dropping mechanism, and connection between the traction-wheel and the dropping mechanism including an automatically-disengaging clutch and a variable-speed mechanism, the variable-speed mechanism being located between the clutch and the dropping mechanism.

2. In a planting-machine, in combination, a traction-wheel, a counter-shaft, connection between the traction-wheel and the counter-shaft comprising an automatically-disengaging clutch, dropping mechanism, and a variable-speed-gear connection between the counter-shaft and the dropping mechanism.

3. In a planting-machine, in combination, a wheeled frame, a driving-shaft for seeding mechanism journaled in the frame, a sleeve inclosing the shaft, variable-speed-gear connection between the sleeve and the shaft, a clutch-disk loose on the shaft, driving connection between a wheel of the frame and the disk, a spring-advanced clutch-arm carried by the sleeve, and a trip movable into and out of the path of the clutch-arm.

4. In a planting-machine, in combination, a wheeled frame, a driving-shaft for seeding mechanism journaled in the frame, a counter-shaft, connection between the counter-shaft and a wheel of the frame comprising an automatically-disengaging clutch, a variable-speed gear, rotative connection between the variable-speed gear and the driving-shaft for seeding mechanism, and a shiftable-gear connection between the counter-shaft and the variable-speed gear.

5. In a planting-machine, in combination, a wheeled frame, a driving-shaft for seeding mechanism journaled in the frame, a sleeve inclosing the shaft, connection between the sleeve and a wheel of the frame comprising an automatically-disengaging clutch, a variable-speed gear, rotative connection between the variable-speed gear and the shaft, and a shiftable-gear connection between the counter-shaft and the variable-speed gear.

ERNEST C. SMITH.

Witnesses:
 SOL HIRSCH,
 O. W. SWENSSON.